United States Patent
Hu et al.

(10) Patent No.: US 8,963,484 B2
(45) Date of Patent: Feb. 24, 2015

(54) ELECTRONIC DEVICE FOR CONTROLLING MAGNITUDE OF CHARGING CURRENT FOR CHARGING TO-BE-CHARGED ELECTRONIC DEVICE

(75) Inventors: Chen-Yang Hu, Taoyuan County (TW); Guo-Wei Jung, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 367 days.

(21) Appl. No.: 13/586,826

(22) Filed: Aug. 15, 2012

(65) Prior Publication Data

US 2013/0043831 A1    Feb. 21, 2013

(30) Foreign Application Priority Data

Aug. 18, 2011 (TW) .............................. 100129599 A

(51) Int. Cl.
*H02J 7/00* (2006.01)

(52) U.S. Cl.
CPC .............. *H02J 7/0068* (2013.01); *H02J 7/007* (2013.01)
USPC ............ 320/107; 320/135; 320/125; 320/160

(58) Field of Classification Search
CPC ................................. H02J 7/0068; H02J 7/007
USPC ................... 320/107, 135, 126, 160
See application file for complete search history.

(56) References Cited

U.S. PATENT DOCUMENTS

| | | | | |
|---|---|---|---|---|
| 4,554,500 A * | 11/1985 | Sokira | ............................ | 320/139 |
| 5,949,661 A * | 9/1999 | Minkkinen | ................ | 363/21.07 |
| 7,843,707 B2 * | 11/2010 | Chen et al. | ...................... | 363/17 |
| 8,319,482 B2 * | 11/2012 | Matsuo et al. | ................ | 323/224 |
| 2006/0044845 A1 * | 3/2006 | Fahlenkamp et al. | ....... | 363/21.15 |
| 2006/0279266 A1 * | 12/2006 | Currell | ........................... | 323/282 |
| 2007/0096671 A1 * | 5/2007 | Korssell | ........................ | 318/432 |
| 2009/0027013 A1 | 1/2009 | Odaohhara | | |
| 2011/0110129 A1 * | 5/2011 | Busch | ............................. | 363/53 |
| 2012/0223649 A1 * | 9/2012 | Saes et al. | ..................... | 315/186 |

FOREIGN PATENT DOCUMENTS

| | | | | | |
|---|---|---|---|---|---|
| JP | 05276673 A | * | 10/1993 | ............... | H02J 7/00 |
| JP | 2006074886 A | * | 3/2006 | ............... | H02J 7/16 |
| JP | 2006129540 A | * | 5/2006 | ............... | H02J 7/04 |
| JP | 2008187865 A | * | 8/2008 | ............... | H02J 7/00 |
| JP | 2008220099 A | * | 9/2008 | ............... | H02J 1/00 |
| TW | 200637104 | | 10/2006 | | |

* cited by examiner

*Primary Examiner* — Phallaka Kik

(57) ABSTRACT

By controlling a charging current magnitude for charging a to-be-charged electronic device by a charging electronic device and current magnitudes of other loading elements of the charging electronic device, when the charging electronic device is switched to a fast charge mode or to an efficiency mode from a normal charge mode, a required current can be directly provided to the to-be-charged electronic device without raising a hardware cost for upgrading charging capabilities.

18 Claims, 4 Drawing Sheets

ELECTRONIC DEVICE FOR CONTROLLING MAGNITUDE OF CHARGING CURRENT FOR CHARGING TO-BE-CHARGED ELECTRONIC DEVICE

BACKGROUND OF THE INVENTION

1. Field of the Invention

The present invention relates to an electronic device, and more particularly, an electronic device for controlling a magnitude of a charge current for charging a to-be-charged electronic device.

2. Description of the Prior Art

A to-be-charged electronic device having functions of large power consumption, such as a data transfer function, may be a portable electronic device, such as a smart phone or a tablet computer. When the to-be-charged electronic device consumes a significant amount of power, the to-be-charged electronic device requires connection to an external power source or a charge-type electronic device equipped with a power source; therefore, the external power source or the charge-type electronic device may be utilized for charging a battery included by the to-be-charged electronic device so that operations of the to-be-charged electronic device may be maintained.

Since a charge-type electronic device equipped with a power source requires a higher capability of supplying power than its normal operations when the charge-type is utilized for charging the to-be-charged electronic device, power-supplying hardware of the charge-type electronic device is conventionally upgraded for reaching the required higher capability of supplying power. However, comes at a price as hardware cost of the charge-type electronic device must be raised significantly so that disadvantages occur in mass fabrication of the charge-type electronic device because of the raised hardware cost.

SUMMARY OF THE INVENTION

The claimed invention discloses an electronic device for controlling a magnitude of a charge current for a to-be-charged electronic device. The electronic device comprises a connection unit, a first loading unit, a control unit, and a power supply unit. The control unit is configured to control the electronic device to charge the to-be-charged electronic device under a first charge mode or a second charge mode. The power supply unit is coupled to the first loading unit, the control unit and the connection unit. The power supply unit is configured to provide a first current to the to-be-charged electronic device via the connection unit and configured to provide a second current to the first loading unit when the electronic device is under the first charge mode. The control unit is further configured to adjust the second current to be a third current. The power supply unit is configured to generate a fourth current according to both the second current and the third current so as to provide the fourth current to the to-be-charged electronic device when the electronic device is switched from the first charge mode to the second charge mode. The third current is smaller than the second current, and the fourth current is larger than the first current.

The claimed invention discloses an electronic device for controlling a magnitude of a charge current for charging a to-be-charged electronic device. The electronic device comprises a connection unit, a loading unit, a control unit, and a power supply unit. The control unit is configured to control the loading unit to be switched to a first operational mode or a second operational mode. The power supply unit is coupled to the loading unit, the control unit and the connection unit. The power supply unit is configured to provide a first current to the to-be-charged electronic device and configured to provide a second current to the loading unit when the electronic device is under the first operational mode. The control unit is further configured to adjust the first current to be a third current. The power supply unit is further configured to generate a fourth current to the loading unit according to the first current and the third current when the electronic device is switched from the first operational mode to the second operational mode. The first current is larger than the third current, and the fourth current is larger than the second current.

The claimed invention discloses an electronic device for controlling a magnitude of a charge current for charging a to-be-charged electronic device. The electronic device comprises a connection unit, a loading unit, a power supply unit, a power calculation unit, and a control unit. The power calculation unit is configured to calculate a current power consumption of the electronic device. The control unit is coupled to the connection unit, the loading unit, the power supply unit and the power calculation unit. The control unit is utilized for calculating an upper-bound current of a first current provided to the to-be-charged electronic device, configured to control the power supply unit to provide the first current to the to-be-charged electronic device via the connection unit, and configured to control the power supply unit to provide a second current to the loading unit when the control unit is under a first charge mode. The control unit is further configured to adjust the second current to be a third current, and the power supply unit is further configured to generate a fourth current to the to-be-charged electronic device according to the second current and the third current when the electronic device is switched from the first charge mode to a second charge mode and when the upper-bound current of the first current is lower than a required current of the to-be-charged electronic device under the second charge mode. The third current is smaller than the second current, and the fourth current is larger than the first current.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
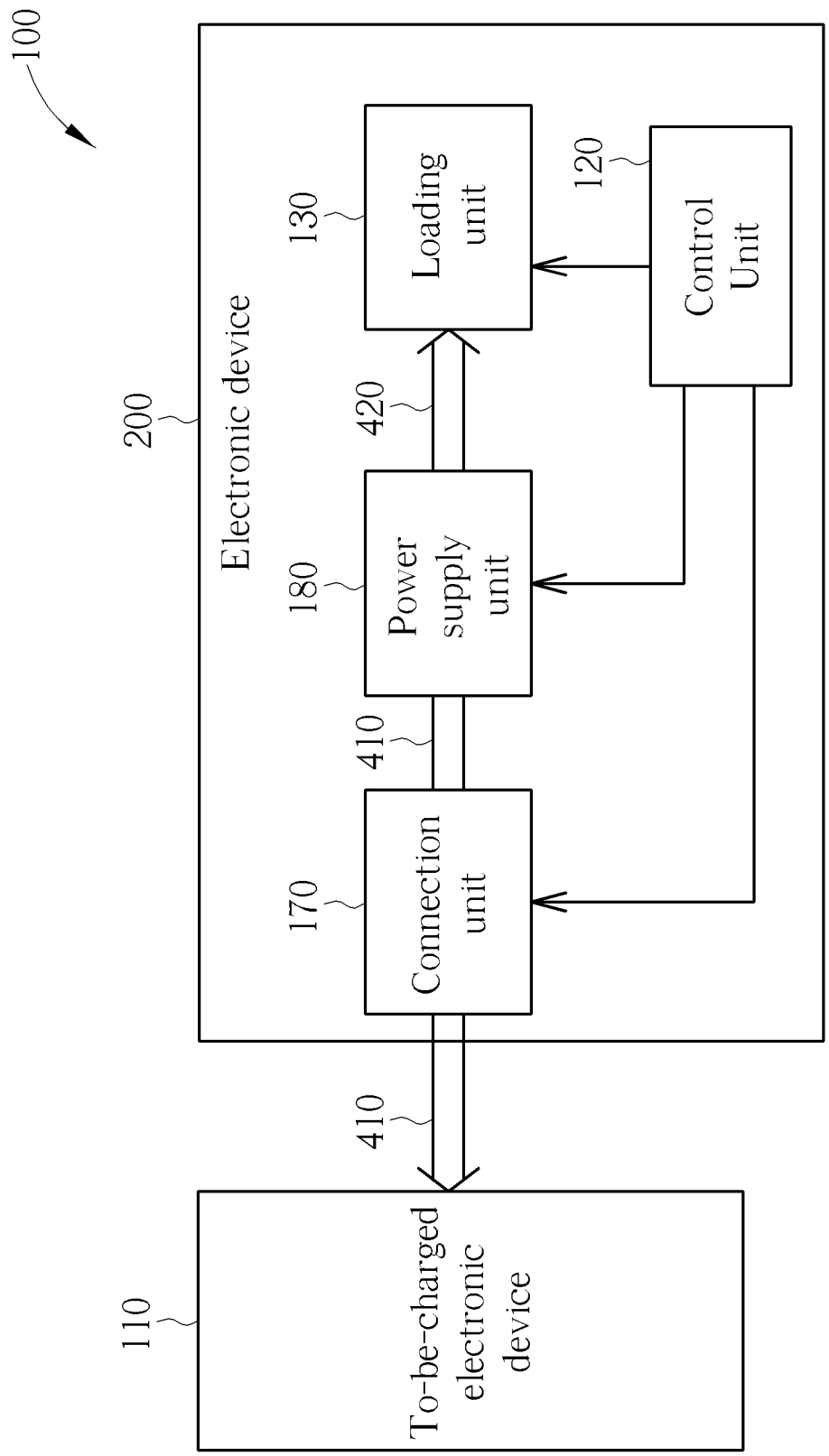
FIGS. 1-4 illustrate a block diagram of a system for controlling an electronic device to charge a to-be-charged electronic device according to embodiments of the present invention.

Please refer to FIG. 1, which illustrates a block diagram of a system 100 for controlling an electronic device 200 to charge a to-be-charged electronic device 110 according to a first embodiment of the present invention. As shown in FIG. 1, the system 100 includes the to-be-charged electronic device 110 and an electronic device 200. When the to-be-charged electronic device 110 is coupled to the electronic device 200, the electronic device 200 is utilized for charging the to-be-charged electronic device 110. The electronic device 200 may be operated under a normal charge mode, a fast charge mode, or an efficiency mode.

Under the fast charge mode, the electronic device 200 is capable of charging the to-be-charged device 110 faster than under the normal charge mode and requires a higher power-supplying level than under the normal charge mode as well.

Under the efficiency mode, since higher performance is required in the electronic device 200, the electronic device 200 charges slower than under the normal charge mode and requires a lower power-supplying level than under the normal charge mode. For example, under the efficiency mode, when a passive element included by the electronic device 200, such as a fluorescent tube, is set to a higher luminance by raising its power consumption, the electronic device 200 is required to lower a charging speed and a power-supplying level of charging the to-be-charged electronic device 110 for transferring some power, which is previously determined to be provided to the to-be-charged electronic device 110, to the fluorescent tube and for fulfilling power requirements of the fluorescent tube, under the supposition that a total power supplied by the electronic device 200 cannot be raised higher.

The electronic device 200 includes a connection unit 170, a power supply unit 180, a control unit 120 and a loading unit 130. The power supply unit 180 is coupled to the loading unit 130, the control unit 120 and the connection unit 170. The loading unit 130 is utilized for implementing functions acquired by the electronic device 200. The connection unit 170 is utilized for establishing a charge path or a data transfer path between the electronic device 200 and the to-be-charged device 110.

The control unit 120 is utilized for controlling the power supply unit 180 to control a current 410 provided to the to-be-charged electronic device 110 and a current 420 provided to the loading unit 130 according to the abovementioned modes of the electronic device 200, to fulfill a purpose of controlling the electronic device 200 to charge the to-be-charged electronic device 110 under the abovementioned modes of the electronic device 200. For example, when the electronic device 200 is switched from the normal charge mode to the fast charge mode, the control unit 120 is configured to control the power supply 180 to raise a magnitude of the current 410 and to lower a magnitude of the current 420 until the electronic device 200 is switched from the fast charge mode to the normal charge mode, for fulfilling a fast charge function of charging the to-be-charged electronic device 110 by the electronic device 200.

In one embodiment of the present invention, when the electronic device 200 is switched from the normal charge mode to the fast charge mode, a total power consumption indicated by the magnitude of the current 410 before being raised plus the magnitude of the current 420 before being lowered is equal to a total power consumption indicated by the magnitude of the current 410 after being raised plus the magnitude of the current 420 after being lowered. When the loading unit 130 is required to raise its power consumption, the electronic device 200 is switched from the normal charge mode to the efficiency mode, and the control unit 120 is configured to control the power supply unit 180 to lower the magnitude of the current 410 to earn enough capacity to raise the magnitude of the current 420 according to the increased power requirement of the loading unit 130.

In other embodiments of the present invention, the electronic device 200 may include at least two loading units, and the control unit 120 may also control magnitudes of currents provided to the at least two loading units via the power supply unit 180 in a similar manner as how to control the magnitude of the current 420 mentioned above. The electronic device 200 may be a display, and the at least two loading units may include a fluorescent tube, a speaker, or a universal serial bus (USB) port.

In one embodiment of the present invention, the electronic device 200 may be a display having a fluorescent tube, a speaker, and/or a USB port as its at least one loading unit. A design of a power supply included by a conventional display merely corresponds to power consumption of the display itself, such as the power consumption from each of the loading units, and power consumption introduced and required by an externally-connected to-be-charged electronic device under a specific charge level; however, when a fast charge function is needed by the user of the electronic device 200 that exceeds the specific charge level, the power supply of the conventional display will fail to fulfill the fast charge function because of the limitation in its design.

On the contrary, in the embodiment of the present invention, factors of determining an active mode of the display may include at least one of the following: (1) the control unit 120 controls the display to enter the normal charge mode, the fast charge mode or the efficiency mode and to select required parameters; (2) a user inputs parameters or commands to the display for commanding the control unit 120 to enter the normal charge mode, the fast charge mode, or the efficiency mode and for selecting parameters, where a user interface of the display for receiving the parameters or commands may be an on-screen display (OSD) equipped on the electronic device 200; or (3) The electronic device 200 is instructed by a software installed on an OSD equipped on the electronic device 200 or on the to-be-charged electronic device 110 to enter the normal charge mode, the fast charge mode, or the efficiency mode and to select parameters.

Figure 2:
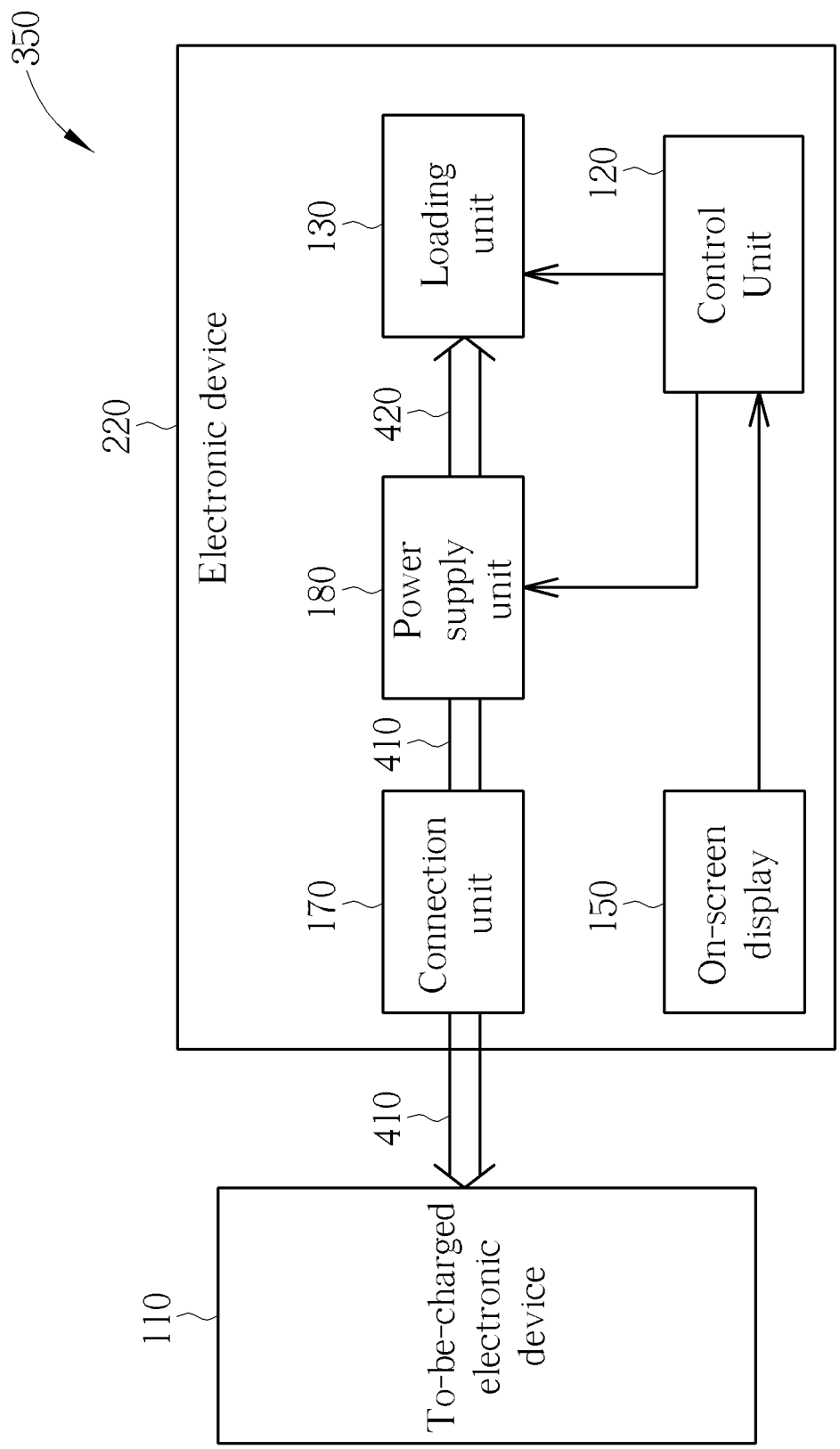

Please refer to FIG. 2, which illustrates a block diagram of a system 350 of controlling an electronic device 220 to charge the to-be-charged electronic device 110 according to a second embodiment of the present invention. A user of the system 350 may issue a command for commanding the control unit 120 to enter a designated mode via an OSD 150 included by the electronic device 220. The OSD 150 may also issue the command to enter the designated mode via a software application installed on the OSD 150. Except for the OSD 150, the electronic device 220 has few differences with the electronic device 200.

Figure 3:
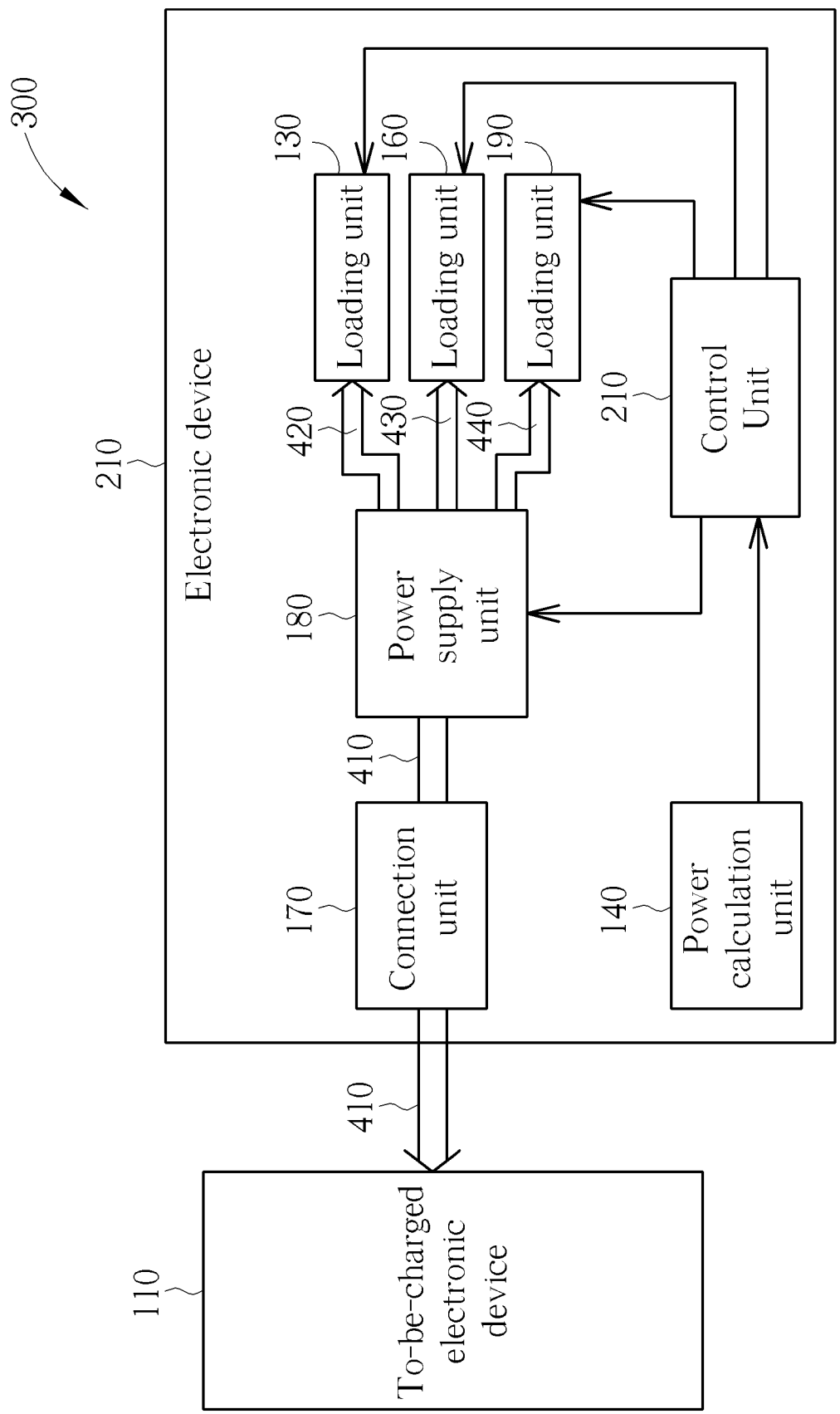

According to one embodiment of the present invention, the control unit 120 is capable of dynamically determining the magnitudes of the currents 410 and 420 according to a current power consumption of an electronic device, for charging the to-be-charged electronic device 110 according to different charge modes of the electronic device. Please refer to FIG. 3, which illustrates a system 300 according to a third embodiment of the present invention. The system 300 includes the to-be-charged electronic device 110 and an electronic device 210. The electronic device 210 further includes a power calculation unit 140 and loading units 160 and 190, in comparison to the electronic device 210 shown in FIG. 1. Note that changing the number of utilized loading units in the above-illustrated embodiments still forms embodiments of the present invention. That is, adding the loading units 160 and 190 does not limit the number of utilized loading units in embodiments of the present invention.

In one embodiment of the present invention, when the electronic device 210 is a 22-inch display, the power calculation unit 140 is capable of calculating the current power consumption of the electronic device 210 according to the following power consumption introduced by the loading unit 130 or 160, which may be a fluorescent tube, a speaker, a USB port, as listed below:

| Backlight luminance | X(watt) | Volume | Y(watt) | Image resolution | Z(watt) |
|---|---|---|---|---|---|
| 90-100 | 25 | 90-100 | 10 | 1920 × 1080p | 5 |
| 70-89 | 17 | 70-89 | 8 | 1920 × 1080i | 4 |
| 50-69 | 12 | 50-69 | 5 | 1280 × 720p | 3 |
| 20-49 | 10 | 20-49 | 3 | 720 × 480p | 2 |
| 0-19 | 7 | 0-19 | 2 | 720 × 480i | 1 |

| Image source | V(watt) | Other parameters | W(watt) |
|---|---|---|---|
| HDMI | E | 90-100 | E |
| TV | D | 70-89 | D |
| VGA | C | 50-69 | C |
| Component Video Connector | B | 20-49 | B |
| Others | A | 0-19 | A |

A current power consumption P calculated by the power calculation unit 140 may be a sum of the variables X, Y, Z, V and W. Parameters A, B, C, D, E, a, b, c, d and e may be predetermined integers. The power calculation unit 140 may be further configured to determine a magnitude of the current 410 according to the following table showing a relation between the current power consumption P and a corresponding magnitude of current:

| Current power consumption P(watt) | Magnitude of the current 410 |
|---|---|
| >=30 | 0.5 amperes |
| 25-29 | 1 ampere |
| 20-24 | 1.5 amperes |
| 10-19 | 2.5 amperes |
| 0-9 | 3 amperes |

For example, suppose that the electronic device 210 is required to provide a current of 1.5 amperes to charge the to-be-charged electronic device 110 under the fast charge mode. When the power calculation unit 140 calculates the current power consumption P to be 20 watts, it indicates that an available magnitude of the current 410 is 1.5 amperes; therefore, the required magnitude of current to charge the to-be-charged electronic device 110 can be fulfilled by the electronic device 210, and efficiencies of loading units of the electronic device 210 and said electronic device 210 itself can be maintained as under the normal charge mode, without updating parameters of the electronic device 210.

However, when the power calculation unit 140 calculates the current power consumption P to be 25 watts, the corresponding magnitude of the current 410 is 1 ampere; it indicates that the current 410 cannot fulfill the power requirement of the to-be-charged electronic device 110 under the fast charge mode. At this time, the abovementioned mechanism of determining a charge mode of the electronic device 210 can be utilized for switching the electronic device 210 to the fast charge mode and for selecting corresponding parameters or commands for maintaining efficiency of each loading unit of the electronic device 210.

In one embodiment of the present invention, the parameters of the electronic device 210 are selected for reducing magnitudes of currents passing through the loading units, i.e. magnitudes of the currents 420, 430 and 440, so as to fulfill the power requirement of the to-be-electronic device 110 under the fast charge mode. In another condition when the fast charge mode is activated, when the current power consumption is 20 watts, and when the user issues a command to the electronic device 210 for raising its luminance or volume, i.e. when the users raises at least one of the loading units 130, 160 and 190, the magnitude of the current 410 may also be lowered with the aid of the three parameter/command setting mechanisms.

In the above embodiments when the electronic device is a display, power consumption of each of the loading units, i.e. the fluorescent tube, the speaker, or the USB port, may be estimated by testing in advance. The estimation can be completed by the power calculation unit 140 or an external test device for testing capabilities of the electronic device 210. Under the fast charge mode, if the power consumption of the to-be-charged electronic device 110 is required to be raised by 10 watts, the estimation is performed by reducing 10 watts of power of the electronic device 210 for providing 10 watts of additional power to the to-be-charged electronic device 110. For example, when the loading unit 130 is a fluorescent tube module having four fluorescent tubes and has power consumption of 25-30 watts, at least 25 watts×40%=10 watts of power consumption can be saved if luminance of the loading unit 130 is reduced by 40%; therefore, the 10-watt saved power consumption may be transferred by the electronic device 210 for supporting the fast charge function of charging the to-be-charged electronic device 110.

In some embodiments of the present invention, a display data channel (DDC) is utilized between the to-be-charged electronic device and the electronic device to perform communications related to charging the to-be-charged electronic device. Please refer to FIG. 4, which illustrates a system 360 according to a fourth embodiment of the present invention. Besides the to-be-charged electronic device 110 and the electronic device 200, the system 360 further establishes a DDC between the to-be-charged electronic device 110 and the electronic device 200, where the DDC acts as a command pipeline for performing information transmission between the to-be-charged electronic device 110 and the electronic device 200. The parameter/command setting and the mode switching of the electronic device 200 can be fulfilled with the aid of an information transmission conducted by the display data channel.

When the to-be-charged device 110 is coupled to the electronic device 200, the electronic device 200 will inform the to-be-charged electronic device 110 of its charge function and an available magnitude of the current 410. The to-be-charged electronic device 110 will issue a charge request to the electronic device 200 according to information of the charge function, so that the electronic 200 may provide the current 410 to the to-be-charged electronic device 110 in response to the charge request. Similarly, the to-be-charged electronic device 110 may also request the electronic device 200 to stop providing the current 410 with the aid of the DDC.

Figure 4:
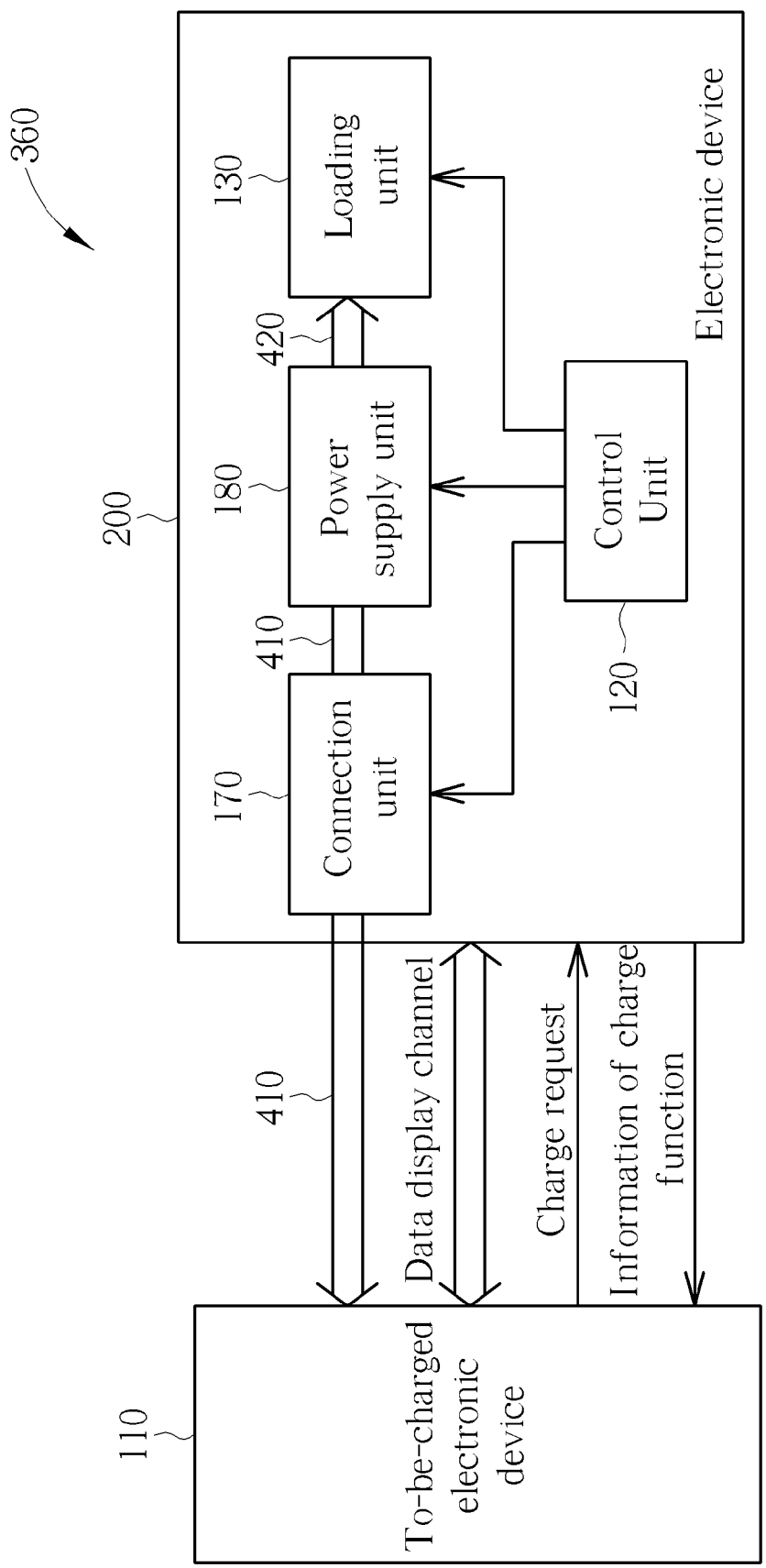

In other embodiments of the present invention, the command pipeline between the to-be-charged electronic device 110 and the electronic device 200 may also be implemented by various types of command pipelines other than the DDC shown in FIG. 4.

Note that embodiments formed by changing the number of utilized loading units, by replacing the to-be-charged electronic device with any portable electronic device that needs to be charged by an external power source, by rendering the electronic device having a charge function to be a display, or by reasonable combining/permuting elements shown in FIGS. 1-4, in embodiments shown in FIGS. 1-4 should also be regarded as embodiments of the present invention.

The present invention discloses an electronic device for controlling a magnitude of a charge current for charging a to-be-charged electronic device. With the aid of the electronic device in controlling the magnitude of the charge current or a charge mechanism, the electronic device is capable of utilizing a charge mechanism for fitting power requirements of a fast charge function without additionally increasing hardware cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device configured to control a magnitude of a charge current for a to-be-charged electronic device, comprising:
   a connection unit;
   a first loading unit;
   a control unit configured to control the electronic device to charge the to-be-charged electronic device under a first charge mode or a second charge mode; and
   a power supply unit coupled to the first loading unit, the control unit and the connection unit;
   wherein the power supply unit is configured to provide a first current to the to-be-charged electronic device via the connection unit and configured to provide a second current to the first loading unit when the electronic device is under the first charge mode;
   wherein the control unit is configured to adjust the second current to be a third current, and the power supply unit is configured to generate a fourth current according to both the second current and the third current so as to provide the fourth current to the to-be-charged electronic device when the electronic device is switched from the first charge mode to the second charge mode; and
   wherein the third current is smaller than the second current, and the fourth current is larger than the first current.

2. The electronic device of claim 1, wherein the electronic device is a display, and the first loading unit is a backlight source, a speaker, or a universal serial bus port.

3. The electronic device of claim 2 further comprising:
   a second loading unit coupled to the power supplying unit;
   wherein the control unit is configured to control the power supply unit to reduce a current to be provided to the second loading unit and configured to raise a current to be provided to the to-be-charged device according to the reduced current provided to the second loading unit when the electronic device is switched from the first charge mode to the second charge mode.

4. The electronic device of claim 3 further comprising:
   an on-screen display configured to select the first loading unit and/or the second loading unit to provide the fourth current when the electronic device is switched from the first charge mode to the second charge mode.

5. The electronic device of claim 1 further comprising:
   a power calculation unit coupled to the control unit, configured to calculate a current power consumption of the electronic device and configured to calculate the first current and the third current according to the current power consumption.

6. The electronic device of claim 1, wherein the control unit is configured to control the power supply unit to provide a fifth current to the to-be-charged electronic device via the connection unit and configured to control the power supply unit to maintain the second current provided to the first loading unit when the electronic device is switched from the first charging mode to a third charging mode; and
   wherein the fifth current is smaller than the first current.

7. The electronic device of claim 1, wherein a display data channel is utilized for perform information transmission between the to-be-charged electronic device and the electronic device, so as to render the to-be-charged electronic device informed of information of the first current.

8. The electronic device of claim 1, wherein a first total power consumption, which indicates a total power consumption introduced by the first current and the second current, is equal to a second power consumption, which indicates a total power consumption introduced by the third current and the fourth current.

9. An electronic device configured to control a magnitude of a charge current for charging a to-be-charged electronic device, comprising:
   a connection unit;
   a loading unit;
   a control unit configured to control the loading unit to be switched to a first operational mode or a second operational mode; and
   a power supply unit coupled to the loading unit, the control unit and the connection unit;
   wherein the power supply unit is configured to provide a first current to the to-be-charged electronic device and configured to provide a second current to the loading unit when the electronic device is under the first operational mode;
   wherein the control unit is further configured to adjust the first current to be a third current, and the power supply unit is further configured to generate a fourth current to the loading unit according to the first current and the third current when the electronic device is switched from the first operational mode to the second operational mode; and
   wherein the first current is larger than the third current, and the fourth current is larger than the second current.

10. The electronic device of claim 9, wherein the electronic device is a display, and the first loading unit is a backlight source, a speaker, or a universal serial bus port.

11. The electronic device of claim 9 further comprising:
    a power calculation unit coupled to the control unit, configured to a current power consumption of the electronic device and configured to calculate the first current and the third current according to the current power consumption.

12. The electronic device of claim 9, wherein a display data channel is utilized for perform information transmission between the to-be-charged electronic device and the electronic device, so as to render the to-be-charged electronic device informed of information of the first current.

13. The electronic device of claim 9, wherein a first total power consumption, which indicates a total power consumption introduced by the first current and the second current, is equal to a second power consumption, which indicates a total power consumption introduced by the third current and the fourth current.

14. An electronic device configured to control a magnitude of a charge current for charging a to-be-charged electronic device, comprising:
    a connection unit;
    a loading unit;
    a power supply unit;
    a power calculation unit configured to calculate a current power consumption of the electronic device; and
    a control unit coupled to the connection unit, the loading unit, the power supply unit and the power calculation unit, the control unit utilized for calculating an upper-bound current of a first current provided to the to-becharged electronic device, configured to control the power supply unit to provide the first current to the to-be-charged electronic device via the connection unit, and configured to control the power supply unit to provide a second current to the loading unit when the control unit is under a first charge mode;

wherein the control unit is further configured to adjust the second current to be a third current, and the power supply unit is further configured to generate a fourth current to the to-be-charged electronic device according to the second current and the third current when the electronic device is switched from the first charge mode to a second charge mode and when the upper-bound current of the first current is lower than a required current of the to-be-charged electronic device under the second charge mode; and wherein the third current is smaller than the second current, and the fourth current is larger than the first current.

15. The electronic device of claim 14, wherein the electronic device is a display, and the first loading unit is a backlight source, a speaker, or a universal serial bus port.

16. The electronic device of claim 14 further comprising:
a power calculation unit coupled to the control unit, configured to a current power consumption of the electronic device and configured to calculate the first current and the third current according to the current power consumption.

17. The electronic device of claim 14, wherein a display data channel is utilized for perform information transmission between the to-be-charged electronic device and the electronic device, so as to render the to-be-charged electronic device informed of information of the first current.

18. The electronic device of claim 14, wherein a first total power consumption, which indicates a total power consumption introduced by the first current and the second current, is equal to a second power consumption, which indicates a total power consumption introduced by the third current and the fourth current.

* * * * *